United States Patent [19]

Fawley

[11] Patent Number: 4,700,752
[45] Date of Patent: Oct. 20, 1987

[54] CLOCK SPRING CRACK ARRESTOR

[76] Inventor: Norman C. Fawley, 5701 Seaside Walk, Long Beach, Calif. 90803

[21] Appl. No.: 812,726

[22] Filed: Dec. 23, 1985

Related U.S. Application Data

[63] Continuation-in-part of Ser. No. 633,684, Jul. 25, 1984, Pat. No. 4,559,974, which is a continuation of Ser. No. 432,321, Oct. 1, 1982, abandoned.

[51] Int. Cl.[4] .............................................. F16L 9/14
[52] U.S. Cl. ..................................... 138/172; 138/178
[58] Field of Search .................. 24/16 R, 16 PB, 530, 24/550; 138/92, 99, 103, 110, 141, 144, 153, 172, 174, 178, DIG. 1, DIG. 2; 156/169, 171, 174; 428/36

[56] References Cited

U.S. PATENT DOCUMENTS

| | | | |
|---|---|---|---|
| 2,728,345 | 12/1955 | Lyon | 24/530 X |
| 2,924,546 | 2/1960 | Shaw | 138/99 X |
| 3,321,924 | 5/1967 | Liddell | 138/99 X |
| 3,358,898 | 12/1967 | Medkeff et al. | 138/99 X |
| 3,698,746 | 10/1972 | Loncaric | 138/178 X |
| 4,181,157 | 1/1980 | DeCamp | 138/178 X |
| 4,224,966 | 9/1980 | Somerville | 138/178 X |
| 4,559,974 | 12/1985 | Fawley | 138/178 X |

Primary Examiner—Stephen Marcus
Assistant Examiner—Mark Thronson
Attorney, Agent, or Firm—Marvin A. Naigur; John P. Shannon

[57] ABSTRACT

A crack arrestor for a pipe is in the form of a clock spring defined by a spiral band of high tensile strength material having an elasticity maintaining the band in contact with the pipe. A method for making the crack arrestor includes saturating high tensile strength filaments with a resin, winding the saturated filaments around a mandrel in a plurality of convolutions, and establishing an elastic set in the convolutions by curing the resin.

19 Claims, 6 Drawing Figures

CLOCK SPRING CRACK ARRESTOR

CROSS REFERENCE TO RELATED APPLICATIONS

This is a continuation-in-part of Ser. No. 633,684, filed July 25, 1984, issued as U.S. Pat. No. 4,559,974 which is a continuation of Ser. No. 432,321, filed Oct. 1, 1982, and now abandoned.

BACKGROUND OF THE INVENTION

The present invention relates to crack arrestors for stopping a propagating ductile fracture in a pipe and a method for making such crack arrestors.

Under certain conditions, pipes are subject to failure by the generation of a crack running in the axial direction of the pipe at high speeds and with tremendous force. Pipes containing gases or volatile liquids at a relatively high pressure and suffering from a flaw or damage from an external force, such as an impact from a machine, are susceptible to a propagating ductile fracture, or a free-running crack, travelling at velocities on the order of 400-1200 feet per second (122-366 meters per second). Numerous proposals have been made to limit ductile fracture propagation in pipes and especially in pipelines, including the use of such cumbersome devices as heavy walled pipes, cables, concrete abutments, valves and metal sleeves. Each crack arrestor of the prior copending applications, Ser. Nos. 633,684 and 432,321, comprises a band of continuous, high tensile strength, non-corrodible, lightweight nonmetallic fibers encapsulated in a resin matrix. Such a crack arrestor has numerous advantages over previous crack arrestors in terms of, for example, lightness, corrosion resistance and non-interference with the cathodic corrosion protection of the pipe. However, like the previous crack arrestors, the crack arrestors of the copending applications present problems with respect to installation of the crack arrestors on a pipe in the field and especially in retrofitting existing buried pipelines or pipelines which have already been welded together.

Where a preformed encircling band is used as a crack arrestor for an existing pipeline, the pipe must be cut and the pipes on opposite sides of the cut must be separated to permit placing the band on the pipe, and the cut must be rewelded in the field and the pipe must be coated again with corrosion protection. Such a procedure is expensive and time consuming, especially where climatic conditions are harsh and where the existing pipeline is buried. For buried pipelines such a cut and reweld procedure would require considerable excavation on both sides of the cut so that the pipe could be moved to allow insertion of the crack arresting band.

Some crack arrestor bands, including some of those disclosed in the copending applications, lend themselves to winding around a pipe without the need for cutting the pipe, and machines are available for performing such winding. However, such machines are expensive, can be difficult to maneuver into the proper position in the field and would require considerable excavation at each point along the pipeline where an arrestor is to be installed to provide the machine with access to the pipe.

Although hand winding in the field is possible, it involves problems of wetting the fibers with the resin so that the resulting composite material has the proper proportions of resin and fiber content. In addition, the uncured resin gives off fumes which are flammable and heavier than air, so that they could cause suffocation, especially in a trench or bell hole. Furthermore, hand winding in the field requires the handling of a long strip or long strands of material or the manipulation of a spool of strip or strand material around the pipe while maintaining the material taut in order to wind it in neat, orderly contact with the pipe and without wrinkles, bulges or tangles. Thus, a crack arrestor installer must hold in place on the pipe the leading end of the strip or strands to be wrapped and simultaneously pull the remaining portion of the strip or strands, or the spool on which they are coiled, around the pipe while assuring that the material is in firm contact with the pipe, and that any subsequent layers of material are in firm contact with the underlying layers. Such a procedure is especially difficult if it is performed in rain or snow, in severe heat or cold, or in a trench containing a pipeline or in a bell hole, which is a generally cylindrical excavation around one of several points along a pipeline, as opposed to a continuous trench. Furthermore, the trailing edge of the material defining the crack arrestor must be securely fastened to prevent it from unwrapping and diminishing the strength of the arrestor. Moreover, the wrapping of material containing uncured resin requires a source of heat or other means for curing the resin on the job site. The installer must wrap the crack arresting band to the correct width and thickness to stop a propagating ductile fracture for the particular pipe material, diameter, wall thickness and service pressure involved. Such a requirement involves calculations or at least material measurement and manual dexterity by the installer and, thus, requires a worker of some skill. In addition, such a wrapping procedure can result in some crack arrestors of inadequate strength and other crack arrestors employing an excess of material.

SUMMARY OF THE INVENTION

It is therefore an object of the invention to provide a crack arrestor which is easy to install, even in the field, and especially on existing pipelines with unskilled labor.

It is a further object of the present invention to provide a crack arrestor which can be installed without cutting or moving the pipe and can be installed by an unskilled worker in the field and especially in a restricted space.

It is another object of the present invention to provide a crack arrestor which can be installed without machinery or heavy tools and is premeasured to be the correct size for a particular pipeline operating under preestablished service conditions.

It is yet another object of the present invention to provide a method for making a crack arrestor capable of satisfying the foregoing objects of the present invention.

Toward the fulfillment of these and other objects, a crack arrestor comprising a clock spring spiral, having the elastic properties of a spring for self-retention on a pipe, is provided to stop a propagating ductile fracture. The spiral of the clock spring crack arrestor includes a plurality of concentric elastic convolutions and has at every point on the spiral a radius of curvature smaller than the radius of the outer diameter of the pipe and an elastic memory for returning to the radius of curvature, so that the elasticity of the crack arrestor biases each point of the innermost convolution of the spiral ont the pipe in firm engagement with the pipe and biases the remaining convolutions into firm engagement with the underlying convolutions. The crack arrestor includes a band comprising a large plurality of continuous, lightweight, high strength, electrically non-conductive nonmetallic fibers extending parallel to one another lengthwise of the crack arrestor and a resinous material encapsulating the fibers. Each convolution of the band defines an inner surface and an outer surface in continuous contact with facing surfaces of adjacent convolutions when the arrestor is on the pipe, thereby substantially preventing expansion of the spiral by a propagating ductile fracture.

The spiral configuration of the clock spring crack arrestor is easy to handle, occupies a small space and, because of its elastic memory, will remain in a coiled shape even when dropped or held by its outer end. Therefore, when the outer end is placed on a pipe, the remainder of the coil remains in contact with the pipe, and this situation exists as the clock spring arrestor is unwound gradually and fed around the pipe. Therefore, a minimum of space is required around the pipe to accommodate the arrestor and its installation procedure. Furthermore, the elastic memory of the spring prevents it from unwinding after it has been installed.

The preformed nature of the clock spring crack arrestor permits it to be precisely premeasured as to width, length and diameter for the particular pipe in the particular type of service on which it is to be used. The appropriate dimensions can be determined as a result of testing in a laboratory. The elimination of the need for calculating, measuring or cutting in the field permits the arrestors to be installed by an unskilled worker and in severe weather conditions.

DETAILED DESCRIPTION OF THE PREFERRED EMBODIMENTS

Figure 1:
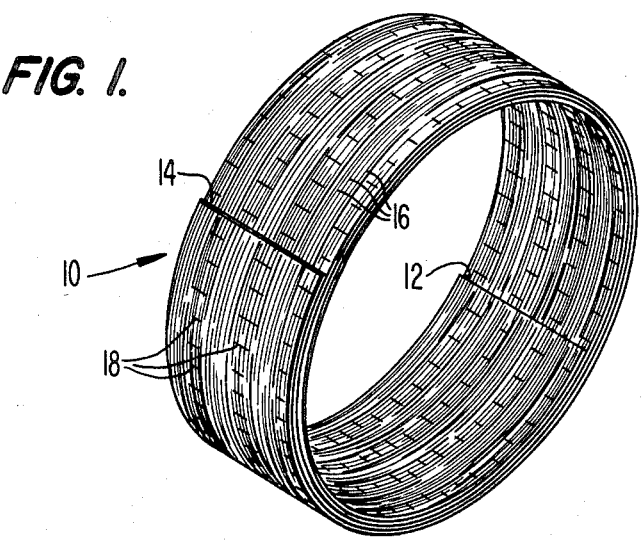
FIG. 1 is a perspective view of the clock spring crack arrestor according to the present invention.

As can be seen from FIG. 1, the clock spring crack arrestor according to the present invention, which is designated generally by the reference numeral 10, comprises a spiral web of composite material having a rectangular cross section and a plurality of concentric elastic convolutions including an innermost convolution having an inner end 12, an outermost convolution having an outer end 14, and intermediate convolutions. The composite material includes a large plurality of lightweight, high tensile strength, electrically non-conductive nonmetallic fibers extending parallel to one another along the length of the web, the fibers being encapsulated in a cured resin matrix. Although the parallel fibers are generally indicated in FIG. 1 by parallel longitudinal lines 16, each space between adjacent parallel lines 16 actually represents hundreds or thousands of longitudinal fibers, each having a diameter of less than 0.001 inch (0.0025 centimeter).

The longitudinal fibers may be held together by cross threads 18, which can facilitate the application of the resin matrix to the fibers during manufacturing prior to curing. With the cured resin in place, the composite material is impervious to soil corrosion and most fluids and, thereby, protects the fibers and the portion of the pipe underlying the crack arrestor 10 from corrosion. Glass is a suitable material for the fibers and especially E-type glass fibers, because they are relatively inexpensive, although other fibers, such as fibers made of Kevlar, may also be used. Suitable resins are elastic when cured and, when they are cured in a coiled spiral configuration as in the crack arrestor 10, they will return to the same configuration after being uncoiled, once the uncoiling force is removed. Like the fibers, the resins are electrically non-conductive thereby enabling the clock spring crack arrestors to preserve the cathodic corrosion protection of the pipe. Polyester, polyurethane or epoxy resins can be used.

Figure 2:
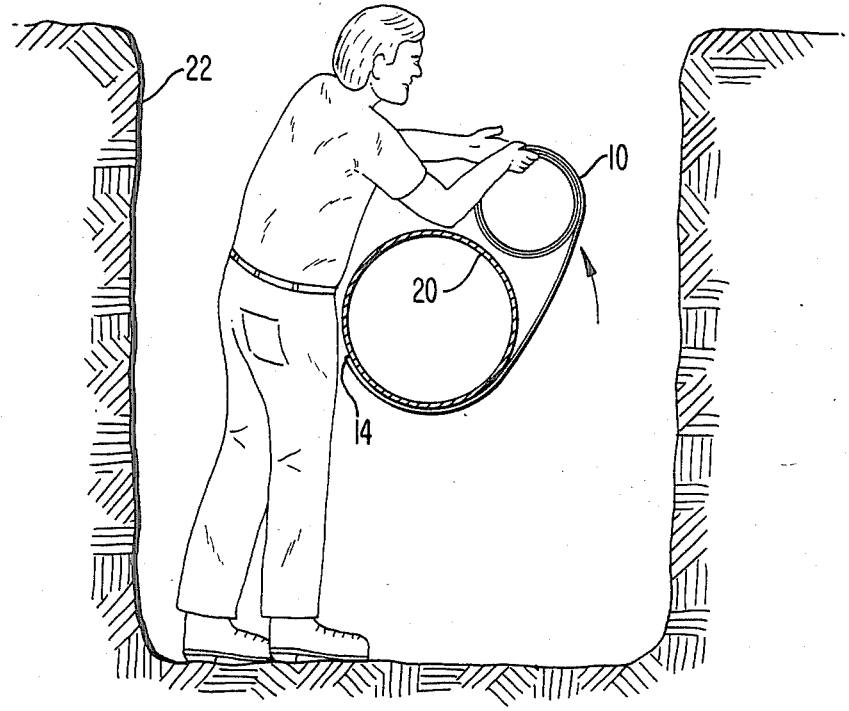
FIG. 2 is a view of the clock spring crack arrestor of FIG. 1 being installed around a pipe in a restricted space.

FIG. 2 illustrates the installation of a crack arrestor 10 according to the present invention around a pipe 20 in a trench 22 in which the pipe, as a part of a pipeline, is normally buried. Although the trench 22 is shown quite wide and deep for clarity of illustration, the crack arrestor 10 can be installed in a smaller trench, the only space required being sufficient clearance to allow the coil of the crack arrestor 10 to pass around the circumference of the pipe 20. Rather than a continuous trench 22, bell holes can be dug at discrete points along an existing buried pipeline to permit the installation of a crack arrestor 10 at each of the points.

Figure 3:
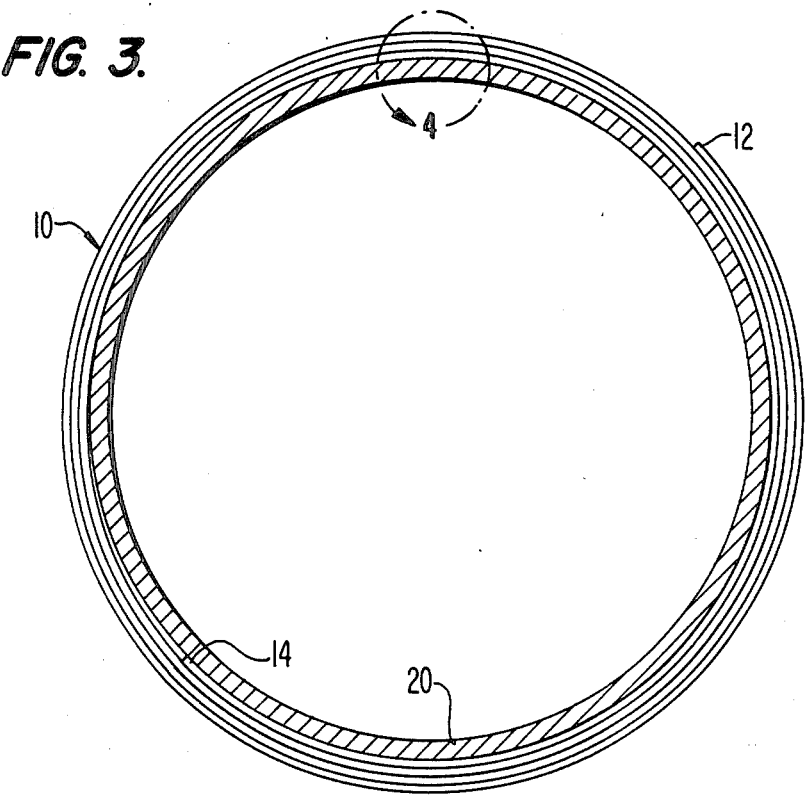
FIG. 3 is an end view of the crack arrestor in its operative position on the pipe.

As can be seen from FIG. 2, the outer end 14 of the clock spring crack arrestor 10 can be pulled away from the remaining portion of the spiral and placed around the pipe 20 to be protected, with the concave side of the crack arrestor in contact with the outer surface of the pipe. For a particular diameter pipe, the diameter of the crack arrestor spiral is chosen so that the radius of curvature of every part of the spiral is smaller than the radius of curvature of the pipe. For example, for a 20 inch (51 centimeter) diameter pipe, a crack arrestor spiral with an innermost convolution having a diameter of 10 to 12 inches (25 to 30 centimeters) has been found to be suitable. The width of the crack arrestor 10, the thickness of each layer, and the number of layers used for a particular application depends on such factors as the material of the pipe, its diameter and wall thickness, and the pressure of the fluid it will carry. All of the dimensions of the crack arrestor 10 can be predetermined in the laboratory by testing, and all of the crack arrestors for the particular application can be manufactured to the predetermined specifications. As a result of the radius of curvature of the spiral being smaller than the radius of curvature of the pipe, when the crack arrestor 10 is in contact with the pipe 20, the convolutions of the crack arrestor spiral are deformed or deflected from their unstressed configurations and, therefore, the elastic memory of the convolutions biases the crack arrestor toward its unstressed configuration and, thus, into firm contact with the pipe 20, for the first layer around the pipe, and into firm contact with the underlying layers for each of the subsequent layers of the crack arrestor. The force of elasticity of the convolutions is greater than the weight of the crack arrestor 10, causing the crack arrestor to remain in its clock spring spiral even when supported only by the outer end 14. Therefore, the elasticity of the crack arrestor 10 prevents it from accidentally uncoiling, and the placement of a first length of the crack arrestor around a portion of the circumference of the pipe 20 will hold the remainder of the crack arrestor in its coiled configuration and in contact with the pipe. From that point, the installer need only handle the portion of the crack arrestor 10 remaining in coiled configuration and uncoil it while moving the coil around the pipe 20 until the inner end 12 of the coil is in place on the pipe. The elasticity of the crack arrestor maintains the inner end 12 of the coil, which becomes the outer end of the installed crack arrestor, firmly in place against the underlying layer of crack arrestor, as shown in FIG. 3.

Figure 4:
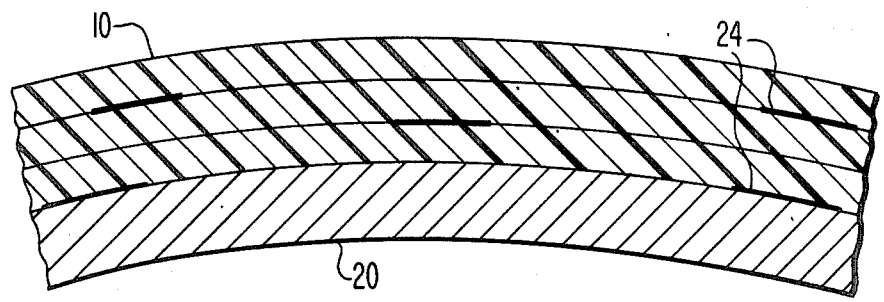
FIG. 4 is an enlargement of the area 4 of FIG. 3, showing areas of adhesive.

Each layer of the crack arrestor 10 defines an inner surface and an outer surface which, because of the elasticity of the crack arrestor convolutions, are biased into continuous frictional contact over their entire areas with corresponding surfaces of adjacent layers, thereby preventing any expansion of the crack arrestor spiral by a propagating ductile fracture which could defeat the crack arresting ability of the crack arrestor. In this respect, it is advantageous to use in the composite material of the crack arrestor resins which are somewhat tacky even when completely cured, such as the previously mentioned polyurethane resins, so as to enhance the resistance of the crack arrestor spiral to expansion by a propagating ductile fracture. As can be seen from FIG. 4, in addition to or as an alternative to the tacky cured resin, the installation of the crack arrestor 10 may be aided by using an adhesive, such as an epoxy adhesive, for securing the end 14 of the crack arrestor to the pipe with an adhesive and thereafter securing subsequent layers with adhesive globs 24 applied, for example, at a few discrete locations on each layer, as well as for securing the end 12 of the crack arrestor to the underlying layer.

Figure 5:
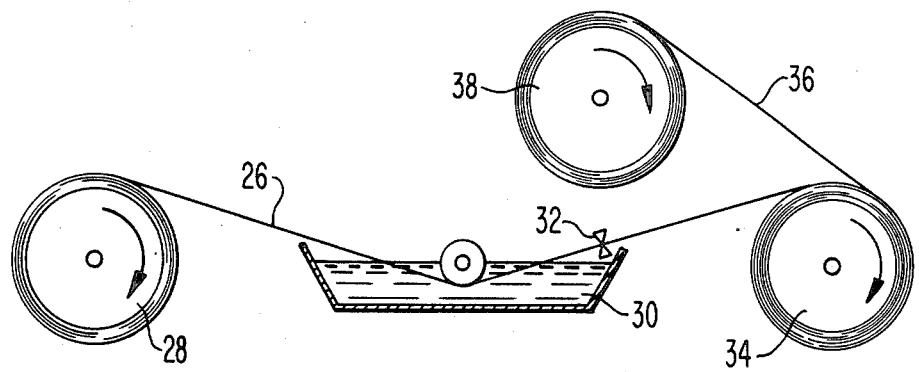
FIG. 5 is a schematic view of winding a composite material on a mandrel in the preparation of a clock spring crack arrestor according to the present invention.

As can be seen from FIG. 5, the clock spring crack arrestor 10 can be made by saturating a web 26 of filaments, such as a preformed tape of fibers having cross threads, for example, by feeding the web 26 from a spool 28 and through a bath 30 of resin, squeegeeing off the excess resin with blades 32 to define a wet impregnated strip of composite material, and winding the saturated filaments around a mandrel 34 in a plurality of convolutions to define a clock spring spiral band. The mandrel 34 has an outer diameter selected to correspond to the desired minimum inner diameter of the spiral depending on the job application. Then, the resin is completely cured to establish an elastic set in the convolutions. In order that the resin-saturated fibers on the mandrel 34 remain in discrete layers, a release film 36 of Mylar or other suitable material, is applied to the outer surface of the resin-saturated fibers, for example, from a spool 38 while the fibers are being wound around the mandrel 34, so that the clock spring crack arrestor 10 can be unwound from the mandrel after curing. A similar release film or release coating is applied to the mandrel 34 itself so that the crack arrestor can be removed. The curing is accomplished under the normal curing conditions for the resin used. For example, for one suitable polyester resin, an appropriate catalyst can be added to the resin in the bath and then the crack arrestor can be cured at a heat of 125° F. (52° C.) for about 1 hour.

Figure 6:
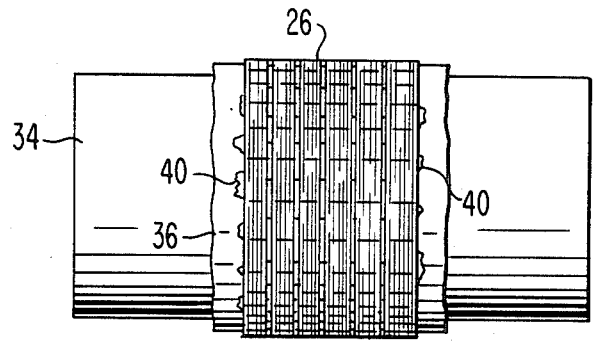
FIG. 6 is a side view of the composite material wound on the mandrel, including flash along the edges of the composite material.

As can be seen from FIG. 6, the interleaving release film 36 is wider than the web 26 of fibers to prevent the resin from running around the edges and connecting with the resin of other layers. Prior to curing, some resin may run out onto the margins of the release film 36 and constitute regions of flash 40 after curing. The composite material is unwound from the mandrel 34 and the release film 36 is removed from the composite material, after which the flash 40 is trimmed, leaving a finished crack arrestor defining a spiral band which is inverse with respect to the spiral band of the filaments on the mandrel 34. The finished crack arrestors require no spools, thereby reducing the number of spools which must be stored in a manufacturing facility and the number of empty spools which must be disposed of after the crack arrestors have been installed on a pipeline.

A latitude of modification, change and substitution is intended in the foregoing disclosure. Accordingly, it is appropriate that the appended claims be construed broadly and in a manner consistent with the spirit and scope of the invention disclosed therein.

I claim:

1. Apparatus for arresting a propagating ductile fracture in a pipe containing fluid under a presssure sufficient to subject the pipe to the possibility of a ductile fracture propagating at a high speed in a predetermined direction, comprising:
    means for stopping the propagating ductile fracture, said stopping means comprising a band of high tensile strength material defining a clock spring spiral terminating in an inner end and an outer end and having a plurality of elastic convolutions for encircling and engaging the pipe, each convolution having an inner surface and an outer surface in contract with corresponding surfaces of adjacent convolutions, said high tensile strength material comprising a plurality of continuous, high tensile strength filaments encapsulated in a resin matrix and extending through said clock spring spiral parallel to the direction of spirtal.

2. Apparatus according to claim 1 wherein said filaments are nonmetallic filaments.

3. Apparatus according to claim 2 wherein the nonmetallic filaments are glass fibers.

4. Apparatus according to claim 3 wherein the glass fibers are E-type glass fibers.

5. Apparatus according to claim 1 wherein said resin is tacky in its cured state.

6. Apparatus according to claim 1 wherein the elasticity of said convolutions biases said band into said clock spring spiral with a force greater than the weight of said band, whereby said band remains in its clock spring spiral when suspended by an outer end of said spiral.

7. Apparatus according to claim 1 wherein said filaments are held together by transverse filaments.

8. Apparatus according to claim 1 wherein the material of said band is electrically non-conductive.

9. The combination of a pipe susceptible to a propagating ductile fracture, and, in contact with the outer surface of said pipe, means for stopping the propagating ductile fracture, said stopping means comprising a band of high tensile strength material defining a clock spring spiral terminating in an inner end and an outer end and having a plurality of elastic convolutions encircling the pipe, the innermost convolution contacting the outer surface of the pipe and each other convolution contacting the adjacent inner convolution, said high tensile strength material comprising a plurality of continuous, high tensile strength filaments encapsulated in a resin matrix and extending through said clock spring spiral parallel to the direction of spiral.

10. The combination of claim 9 wherein said innermost elastic convolution of said clock spring spiral has, in its relaxed state, a radius of curvature smaller than the radius of curvature of the outer surface of the pipe, whereby the elasticity of the convolutions biases said innermost convolution into contact with the outer surface of the pipe and biases all of the other convolutions into contact with the adjacent inner convolutions.

11. The combination of claim 9, further comprising means for securing an inner end of said clock spring spiral to said pipe and an outer end of said clock spring spiral to its adjacent inner convolution, said securing means comprising an adhesive.

12. The combination of claim 11, further comprising means for fixing each said elastic convolution to adjacent elastic convolutions, said fixing means comprising an adhesive.

13. The combination of claim 12 wherein said adhesive is positioned at discrete locations between said elastic convolutions.

14. The combination of claim 9 wherein said filaments are nonmetallic filaments.

15. The combination of claim 14 wherein the nonmetallic filaments are glass fibers.

16. The combination of claim 15 wherein the glass fibers are E-type glass fibers.

17. The combination of claim 14 wherein said resin is tacky in its cured state.

18. The combination of claim 9 wherein the elasticity of said convolutions biases each said convolution into contact with the adjacent inner convolution and biases the innermost convolution into contact with the pipe.

19. The combination of claim 9 wherein said filaments are held together by transverse filaments.

* * * * *